Oct. 19, 1965  J. R. FOSTER  3,212,552
PNEUMATICALLY POWERED TIRE CHANGING STAND
Filed Aug. 6, 1963  4 Sheets-Sheet 1
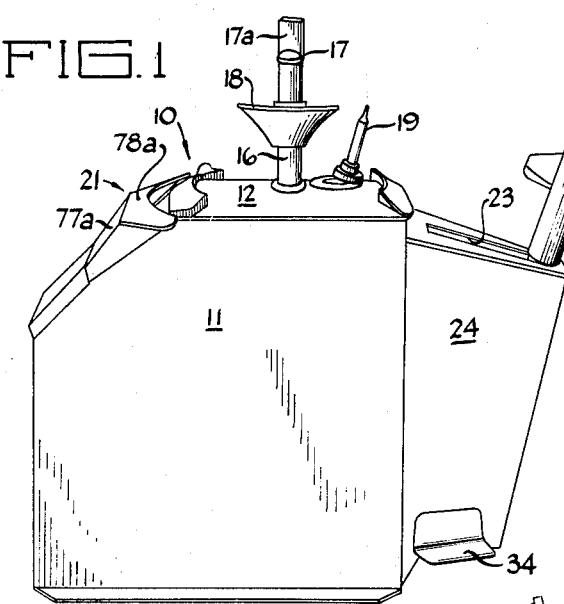
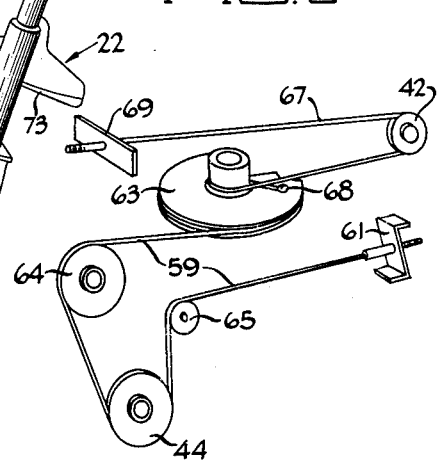
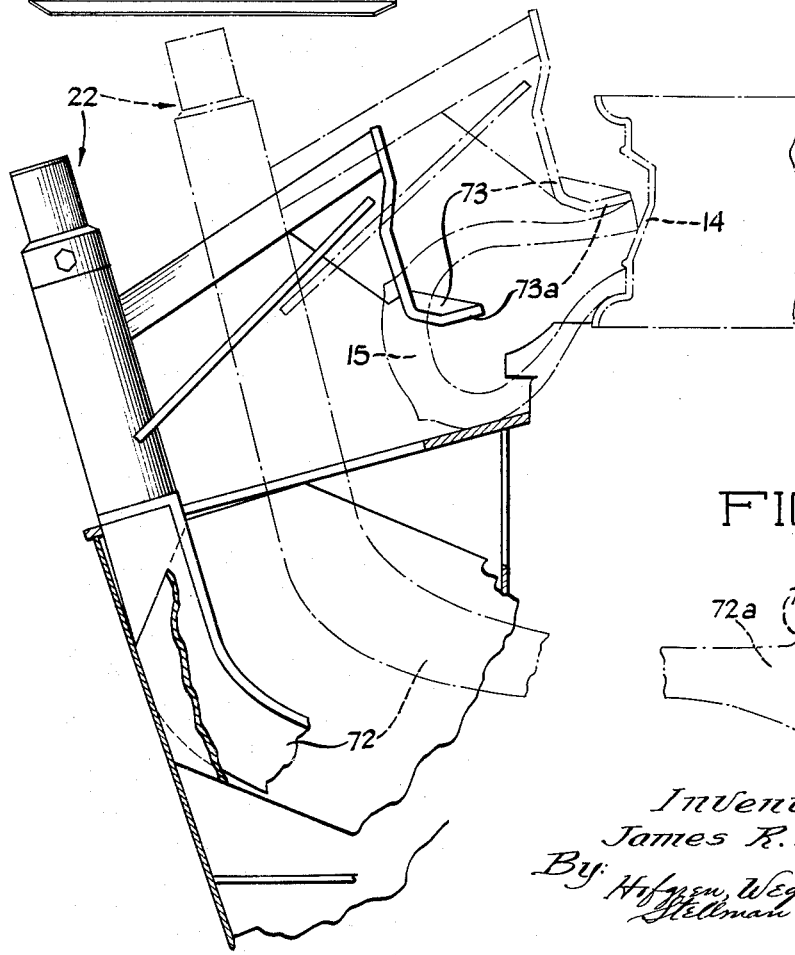
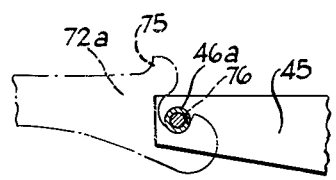
Inventor:
James R. Foster

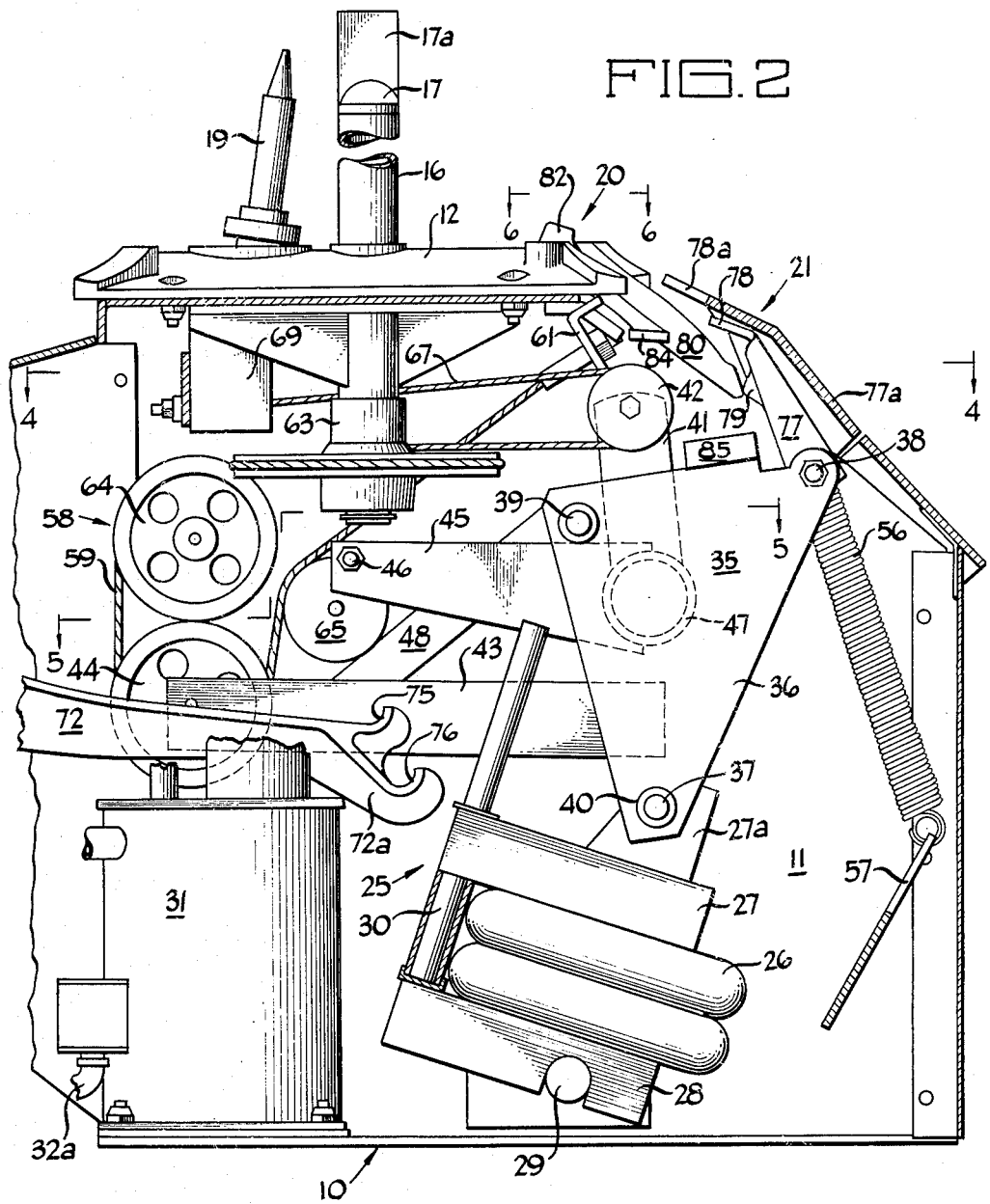

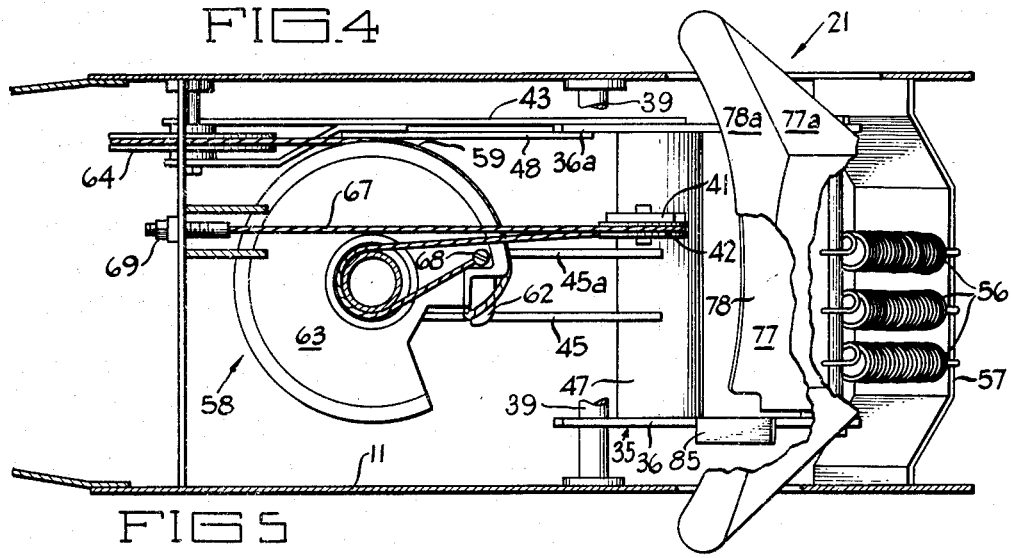
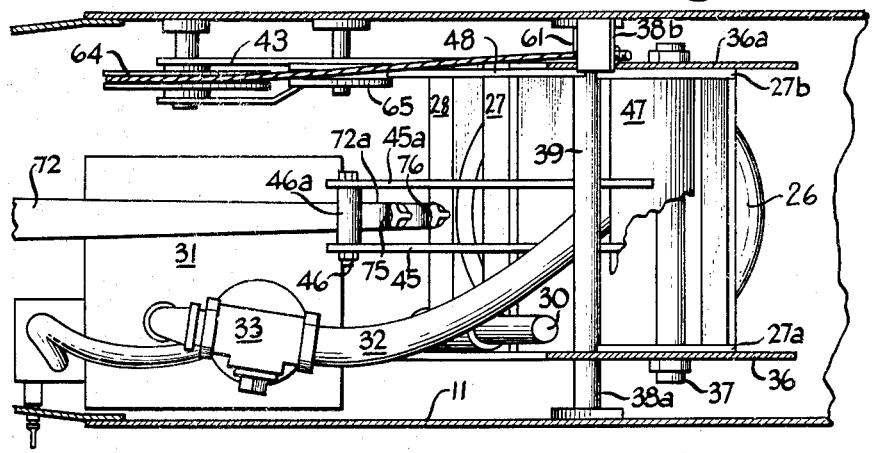
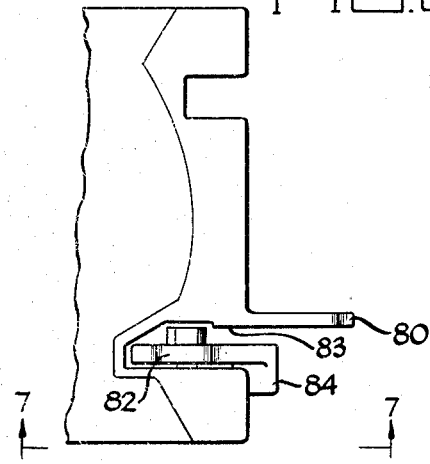
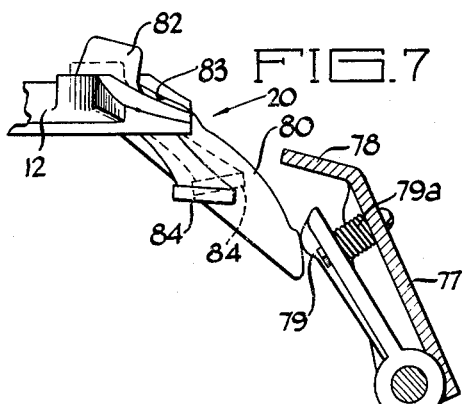

United States Patent Office 3,212,552
Patented Oct. 19, 1965

---

3,212,552
PNEUMATICALLY POWERED TIRE CHANGING STAND
James R. Foster, Webster City, Iowa, assignor to The Coats Company, Inc., a corporation of Iowa
Filed Aug. 6, 1963, Ser. No. 300,235
14 Claims. (Cl. 157—1.17)

This invention relates to tire changing stands and more particularly to a pneumatically powered tire changing stand having but a single lever for translating the motion of the power source into movement of the upper and lower bead breaker shoes and rotation of the tire tool drive shaft.

Tire changing stands are most often used in service stations or garages or the like where there is an available supply of compressed air. It is therefore desirable that the compressed air be utilized to drive the functional components of the tire changing stand. Heretofore, tire changing stands which have used compressed air as a source of power and have incorporated a single power actuator to drive the tire tool drive shaft as well as the upper and lower bead breaker shoes, have incorporated in the functional components of the drive system a plurality of levers and linkages to appropriately translate the power stroke of the power source into effective movement of the aforementioned components. Every additional linkage and lever is a possible source of malfunctioning which may render the machine inoperative due to wear and the stresses and strains placed on such components. Therefore if the number of levers and associated linkages can be reduced, the number of possible trouble spots within the functional components of the drive system may be proportionately reduced and the tire changer may remain operative for longer periods of time without the need for maintenance thereof.

It is therefore a primary object of this invention to provide a new and improved tire changing stand.

It is another object of this invention to provide a new and improved tire changing stand utilizing a single lever operably associated with a power source for driving the components thereof.

It is still another object of this invention to provide a new and improved tire changing stand utilizing a single lever operably associated with a power source to drive the components thereof which lever has means thereon in association with a drive cable operably associated with the tire tool drive shaft for rotating the tire tool drive shaft in response to movement of the lever through an arc, and is operably associated with the lower bead breaking shoes to drive the same when swinging through said arc and selectively engageable with an upper bead breaker shoe to selectively drive said upper bead breaking shoe upon movement through said arc.

It is yet another object of this invention to provide a new and improved tire changing stand having a single lever for driving the functional components thereof wherein said lever is pivotally mounted to the frame of the tire changing stand for movement through an arc in response to actuation of the power source thereof and has a power pulley arm and return pulley arm, each located on either of the sides of said pivotal mounting, respectively, operably associated with the power pulley and return pulley systems, respectively, to rotate the tire tool shaft in response to actuation of the lever and reversely rotate the tire tool shaft in the opposite direction upon termination of the actuation of said lever and return thereof to a normal at rest position.

It is a further object of this invention to provide a new and improved tire changing stand utilizing a single lever for driving the functional components thereof and having means for restricting the stroke of the lower bead breaker shoes when said stand is being used to change smaller tires to protect the rims on which said smaller tires are mounted.

Other objects, features and advantages of the present invention will be apparent from the following description of the preferred embodiment illustrated in the accompanying drawings, in which:

FIGURE 1 is a side elevational view of a tire changing stand embodying this invention;

FIGURE 2 is a fragmentary enlarged vertical section view of the tire changing stand shown in FIGURE 1 showing the parts in relative positions prior to activation;

FIGURE 4 is a section view taken along the line 4—4 of FIGURE 2;

FIGURE 5 is a section view taken along the line 5—5 of FIGURE 2;

FIGURE 6 is a fragmentary section view taken along the line 6—6 of FIGURE 2;

FIGURE 7 is a section view taken along the line 7—7 of FIGURE 6;

FIGURE 8 is a schematic diagram of the pulley and cable systems incorporated in the tire changer of this invention; and FIGURE 9 is an enlarged fragmentary partially broken view in partial phantom outline illustrating the engagement of the upper bead breaker shoe with a tire side wall and the operable engagement of the upper bead breaker arm with a portion of the lever of this invention.

Figure 3:
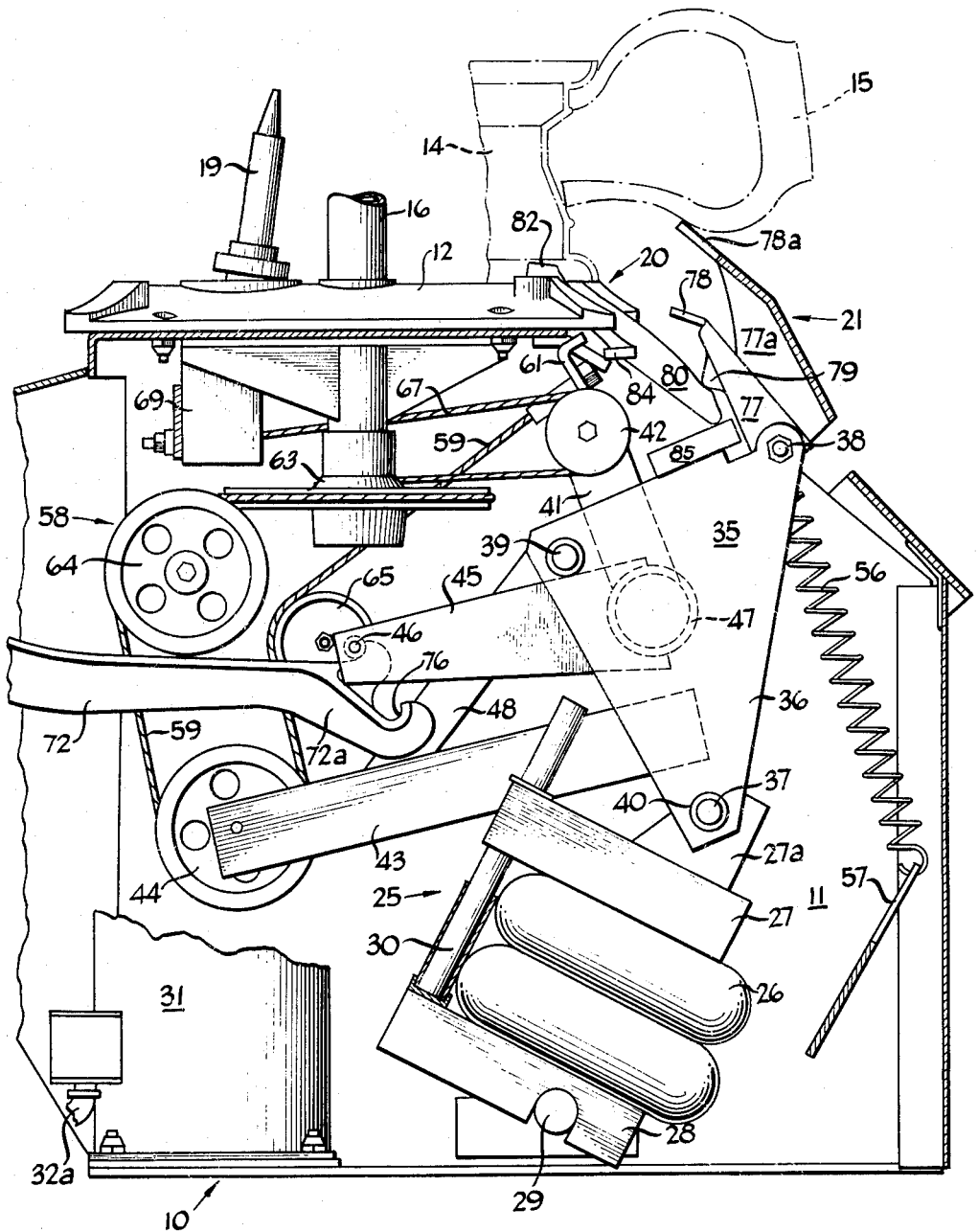
FIGURE 3 is a section view similar to FIGURE 2 illustrating the tire changing stand in operable engagement with a tire mounted on a tire rim with the parts having completed a bead breaking stroke and in process of returning to FIGURE 1 position.

The tire changing stand 10 of this invention has a generally box-like frame 11 of sheet metal material having upstanding walls which serve to enclose most of the functional components thereof as well as further serving as bearing or support means for the components in a manner to be described later. The tire changing stand has a generally horizontal rim or tire supporting surface or platform 12 on the top thereof which is made of cast iron or a similar rugged metal for withstanding the abuse received due to handling relatively heavy vehicular rims and tires and the like as well as receiving forces indirectly imparted thereto as part of the tire mounting and demounting operation. The tire supporting surface 12 is adapted to support vehicular rims 14 for tires 15 of different sizes for appropriate mounting and demounting of tires to and from the rim.

An upright spindle 16 extends upward through an opening in the platform and has a tire tool drive shaft 17 rotatably journaled therein. The tire tool drive shaft 17 is provided with a tire tool engaging surface 17a for operable engagement with a conventional tire tool (not shown) to drive the same peripherally of the wheel rim to aid in mounting and demounting of a tire from a vehicular rim. In the preferred embodiment the tire tool engaging surfaces 17a are shown as flats at the free end of the rotatable shaft which are adapted to be received in a mating longitudinal slot in the aforesaid conventional tire tool.

Also shown on the spindle is a clamping cone or tire hold down device 18 which is used to secure the rim and tire on the platform against vertical movement relative thereto. A substantially upright positioning pin 19 also extends upward from the tire supporting platform and is adapted to be positioned in the bolt holes of a vehicular rim to secure the rim on the platform against rotational movement relative thereto.

Also positioned on the tire supporting platform is a selector means 20 for adapting the tire changer for use with smaller tires in a manner to be explained later.

The lower bead breaker means 21 is provided at one edge of the tire supporting platform and upper bead breaker means 22 is positioned on the opposite side of the tire supporting platform from the lower bead breaker means for cooperatively breaking the tire bead from the rim thereof in a manner to be described in detail later. When not in use, the upper means 22 rests in a slot 23 in the side housing 24 as shown in FIG. 1.

Secured to the interior of the stand is a hydraulically powered actuator means or power source 25. The power source includes a bellows 26 positioned between and secured to an upper mounting pad 27, having upstanding ears 27a and 27b for pivotal securement to the lever as will be explained later; and a lower mounting pad 28, which is pivotally mounted to the base of the stand at 29 so that the actuator may pivot relative thereto. An upright post 30 extends substantially upward from one side of the lower pad through a bushing in one side of the upper pad in sliding engagement therewith so that the two pads may separate relative to each other in response to expansion of the bellows and act as a piston to drive the lever.

The bellows is adapted to expand in response to the influx of liquid under pressure in a conventional manner. A reservoir of liquid 31 is positioned in the interior of the stand and is in fluid communication with the bellows through appropriate air hosing 32 and appropriate piping and jointing and speed control valving 33 to supply a source of liquid thereto upon actuation of the bellows by selective engagement of the foot pedal 34 admitting air to push the liquid out of reservoir 31.

During the time that the liquid is drained from the reservoir during actuation of the bellows, appropriate valving permits compressed air to enter therein through the exterior conduit 32a which is in communication with the compressed air supply of the shop or garage wherein the tire changing stand is being used. Therefore upon selective engagement of the foot pedal, liquid under pressure will be supplied from the reservoir to the bellows causing expansion thereof, which, in turn, will cause the upper mounting pad to slide upward on the post 30 thereby acting as a piston for driving the lever, which is pivotally mounted thereto at the ears 27a and 27b, in a manner to be described shortly.

The lever 35 of this invention includes a pair of upright spaced plates 36 and 36a or rocker arms secured together as a unit by the transversely extending air mounting shaft or actuator mounting shaft 37, the axle 39 and the lower bead breaking means tie rod 38, all of which are substantially a rod extending between the plates generally transverse thereto and secured at either end by appropriate nuts, bushings, etc. to secure the two plates together as a unit. The actuator mounting shaft pivotally secures the lever to the actuator through the appropriate openings in the upstanding ears 27a and 27b of the upper mounting pad at 40. The axle 39 pivotally secures the lever to the interior of the frame by means of bushings 38a and 38b on either end of the axle which are secured to the interior of the side walls of the frame to provide a pivot point about which the lever pivots relative to the frame in response to movement imparted thereto by the power source or actuator by means of the pivotal connection of the lever therewith.

Extending substantially upward from the lever between the axle 39 and the lower bead breaking tie rods 38 is a return cable arm 41 secured at one end to a hub 47, having a return cable pulley 42 rotatably journaled at the extremity thereof. Extending generally laterally from the lever between the axle 39 and the actuator mounting shaft 37 is a power cable arm 43 secured at one end to the plate 36a and having a power arm pulley 44 rotatably journaled at the free end thereof. Also extending generally laterally outward from the lever and substantially parallel to the power cable arm 43 are a pair of spaced substantially parallel upper shoe lever arms 45 and 45a having a rod 46 passing between the free ends thereof with a bushing 46a thereabout for cooperation with the free end of the upper bead breaker arm. In the preferred embodiment the opposite ends of the upper shoe lever arms are mounted on the hub 47 positioned transversely between each of the spaced plates 36 and 36a, respectively, of the lever. A reinforcing arm 48 is provided and extends from the lever 35 from a point near the axle 39 downward toward the free end of the power cable arm where it is secured thereto to give rigidity to the structure.

When the power source is selectively actuated by engagement of the foot pedal and moves the upper mount pad up along the post, the lever will pivot from its at rest position through an arc about its mounting on the axle 39, as shown in FIG. 2, through a point shown in FIG. 3, thereby causing displacement of the return cable pulley, the power cable pulley and the free end of the upper shoe lever arm, all of which will similarly travel through an arc to assist in translating the pivotal movement of the lever into operational movement of the functional components of the tire changing stand in the manner which will be described in detail later herein.

The lever is further provided with a plurality of spaced return springs 56 (in this case three) secured at one end to the lower bead breaker tie rod and at the other end to a mounting bracket 57 secured to the interior of the side walls of the frame. The return spring causes the lever to return to its normal at rest position as shown in FIG. 2 upon termination of the actuation of the power source.

Operably associated with a lever for rotating the tire tool drive shaft is a drive or power pulley means or system 58. Included in the power pulley means is the power or drive cable 59 which is secured at one end to a bracket 61 secured to the interior of the side wall of the frame. At the other end the power cable is secured to a lug 62 on the drive or power pulley 63 and wound about the pulley which is secured to the bottom end of the tire tool drive shaft generally normal thereto. The cable is threaded about the upright idler pulley 64 which is rotatably secured to the interior wall of the frame and is positioned in a plane transverse to the plane of the drive pulley to change the path of travel of the drive cable from tangential to the drive pulley to substantially normal to the axis thereof. The power cable is also threaded about the power arm pulley 44 which is rotatably journaled between the free ends of the power cable arm 43 and positioned directly below the idler pulley 64 in the same plane therewith and, as previously mentioned, travels through an arcuate path when the lever is swung about its axis in response to actuation of the power source. The power cable is further threaded about a third idler pulley 65 which is similarly rotatably journaled in the frame in the same plane as the idler pulleys 64 and 44 and changes the line of travel of the power cable out of the path of other components of the drive system of this invention to its securement with the sheave at 62.

When the lever 35 swings about its pivotal mounting with the axle 39 in response to actuation of the power source, as previously mentioned, the power arm pulley 44 will similarly trace an arcuate path of travel which, in this embodiment, will be downward, or away from, the drive pulley. Since the power cable is fixedly secured to the frame at one end 61 and the movement of the lever arm 44 increases the distance between the various points along the path of travel of the power cable, the power cable will unwind relative to the power pulley on the tire tool drive shaft, thereby rotating the same. This rotation therefore is accomplished by means of only one lever, the lever 35.

Similarly operably associated with the lever means 35 is the return pulley system or means 66. Included in the return pulley means is the return cable 67 which is secured at one end to the post 68 on the drive pulley and is wrapped about the hub thereof. At its opposite end, cable 67 is secured to the sheave 69 which is fastened to the interior of the side wall of the frame. In between these two points of affixation, the return cable is wrapped about the return pulley 42 which is rotatably journaled at the free end of the return pulley arm 41 of the lever 35. As the lever 35 swings through its path of travel in response to actuation of the power source and the drive cable rotates the tire tool drive shaft, the return cable pulley moves closer to the drive pulley, shortening the distance between the points about which the return cable is wrapped, thereby causing the return cable to be wound about the pulley hub as the pulley is rotated by the power cable. When the application of power is terminated and the lever is urged by means of the return springs to return to its normal at rest position, the distance between the points about which the return cable is threaded is increased, causing the return cable to unwind from the pulley hub and thereby rotate the tire tool drive shaft in a reverse direction from the rotation imparted thereto by the power cable. Thus the reverse rotation is also imparted to the tire tool drive shaft through the means of the single lever 35.

Further included in the functional components of the tire changer in operable association with the lever is the upper bead breaker means 22. The upper bead breaker means 22 consists of an arcuate or generally L-shaped bead breaker arm 72 which, as previously mentioned, is positioned in a slot in the side housing 24, and has a free end 72a which extends into the interior of the frame adjacent the lever and the lower bead breaker arm 45 thereof. The opposite exposed end of the bead breaker arm has a bead breaker shoe 73 thereon adapted to engage the side wall of the tire casing and break the tire bead thereof away from the tire rim when operably engaged therewith. The bead breaker shoe has a tire engaging surface 73a which has an arcuate configuration substantially concentric with the tire rim. The tire engaging surface 73a is of sufficient area to enable the shoe to break the seal between the tire bead and the rim when the shoe is moved thereagainst under the power of the actuator translated thereto by the lever 35.

The free end 72a of the bead breaker arm has a jaw-shaped configuration for providing two protruding lips or bearing surfaces 75 and 76. In FIGURE 2 and in full outline in FIGURE 9, the bead breaker arm 72 is shown in its inoperative position. When the upper bead breaker shoe is moved to its operative position, as shown in dotted outline in FIGURE 9, it is positioned against the upper side wall of the tire, causing the arm to hang freely below the tire, the free end of the arm is naturally positioned in contact with or closely adjacent (FIGURE 3) to the bushing 46a so that the bushing may operably engage the bearing surface 75 or, as shown in FIGURE 9, bearing surface 76. After the arm has been placed in the operative position with the free end adjacent the bushing and the power source is actuated causing the lever to pivot relative to its mounting in the frame as previously mentioned, the bushing, being at the free end of the arms 45 and 45a, will also travel an arcuate path which in this case will be downward catching the hook 75 or 76 and, causing the substantially L-shaped arm to move downwardly thus forcing the bead breaker shoe down against the tire casing to break the bead away from the tire rim as shown in phantom outline in FIGURE 9. Thus, when the lever 35 is pivoted in response to actuation of the power source and the upper bead breaker arm is selectively engaged with the bushing between the free ends of the arms 45 and 45a of the lever, the bead breaker shoe will be caused to travel through a functional path for performing its upper bead breaking function in response to the movement of a single lever, the lever 35.

The lower bead breaker means is similarly operably associated with the lever 35. The lower bead breaker means includes the inner and outer lower bead breaker shoes 77 and 77a which are each pivotally secured in vertical tandem to the tie rod 38.

The bead breaking shoes 77 and 77a each have tire engaging surfaces 78 and 78a, respectively, which have an arcuate configuration generally concentric with the tire rim. When a tire and wheel rim is placed upon the table 12, both tire engaging surfaces of both lower shoes are generally out of contact with the tire in their starting position shown in FIGURE 2. Immediately upon actuation of the machine moving the lever 35, the outer shoe 77a will raise but a short distance and come into contact with the side wall of the tire about midway between the tread and the bead of the tire. Thereafter, the shoe because of its friction against the side wall of the tire, will pivot upon the rod 38 so as to permit the tire engaging surface 78a to move substantially in a vertical upward direction. Thus, the outer of the two lower shoes moves off of and out from the inner shoe 77. The space between the side wall of the tire and the rim thus becomes exposed to the tire engaging surface 78 of the inner shoe 77. As movement continues upwardly, the outer shoe bows the side wall of the tire upwardly toward the center of the tire since the side wall is quite flexible. The inner shoe guided by the cam 80 continues upwardly to engage the tire side wall closely adjacent the bead. As soon as engagement of both shoes occurs, additional upward movement unseats the bead and pushes it toward the drop center of the wheel rim. The larger shoe 77a helps by pushing vertically substantially in the position shown in FIGURE 3, whereas the inner shoe 77 has moved in to be quite close to the wheel rim. On reverse motion friction continues to hold the outer shoe against the side wall while the inner shoe 77 retracts on the cam surface. FIGURE 3 shows the shoes on the way back down toward FIGURE 2 position. As soon as the outer shoe moves out of frictional contact with the side wall, it will be free to pivot clockwise into an overlying relation with the inner shoe 77 as illustrated in FIGURE 1.

The inner lower shoe 77 is provided with a means for guiding the shoe relative to the wheel rim support table. A cam follower 79 is adapted to engage a cam 80 on the tire supporting platform so that the inner lower shoe is guided thereby. This external control for the inner lower shoe insures that the tire engaging surface of the shoe will engage the tire in the area intermediate the bead and the portion being contacted by the outer shoe after the tire side wall has been lifted by the outer shoe. The inner shoe exerts a constant pushing action on the tire in an area adjacent the bead. The friction existing between the tire side wall and the outer shoe retains the outer shoe in a substantially upright path so that the inner and outer shoes move conjointly to push the tire bead into the wheel rim drop center. The spring 79a may be positioned between the inner shoe and the cam follower thereunder to permit adjustment of the inner shoe and thereby insure satisfactory operation thereof.

The selector means 20 consists of a dog 82 pivotally mounted in a slot 83 in the edge of the tire supporting platform adjacent the inner and outer lower bead breaker shoes. The dog 82 has a free end or limiting surface 84 which is normally positioned, as shown in FIGURES 2, 3 and 7, substantially parallel to and adjacent the path of travel of the inner lower bead breaker shoe. When a smaller diameter rim, such as for a 13-inch tire, is placed on the tire supporting platform, the edge of the rim will strike the dog causing limited pivoting thereof (dotted position in FIGURE 7) so that the free end 84 will swing outward out of the path of travel of the inner lower bead breaker shoe thereby permitting full lever stroke. As the lever 35 swings about the axle 39 through its path of travel the block 85 on the top of the lever will strike the free end 84 and be held thereagainst preventing further travel. This stop means will permit the shoe to satisfactorily push the tire bead of such narrower tires into the drop center of the rim but will prevent the shoe from traveling further to a point where it might cause damage to the narrower rim.

The tire changing stand of this invention provides a new and improved means for translating forces imparted by a pneumatically operated actuator into movement to rotate a tire tool drive shaft as well as to drive upper and lower bead breaking shoes. Such power is operationally translated through the means of but a single lever eliminating the need for multiple levers and linkages which can be a source of trouble and cause breakdown of the machine. Moreover, the lever system and drive means of this invention utilizes relatively simple components consisting of pulleys, cables and heavy plates and arms which make up the lever itself. Such components are relatively easy and economical to manufacture. The mounting of these components is relatively simple, thus enhancing the economy of production of this tire changing stand. Moreover, with the lever system of this invention the upper and lower bead breaking shoes accomplish their bead breaking function from opposite spaced points, thereby effectuating or imparting a rocking action to the tire during the bead breaking which rocking action serves to equalize the relative binding imparted to the tire when bead breaking is attempted to be accomplished from the same side, thus permitting the bead breaking to be accomplished more rapidly with less likelihood of damage to the tire itself due to overbinding thereof relative to the rim.

The described tire changing stand operates as follows:

The tire and its associated wheel rim are placed upon the table top 12 and held down by the clamping cone 18, care being taken to allow the positioning pin 19 to enter one of the lug openings in the rim. When fastened in place, the wheel rim will be held against coming off of the stand upwardly and against turning relative to the stand.

If the tire has not been previously deflated, this should be done before proceeding further.

Bead breaking is the next operation and the operator generally first picks up the upper bead breaker 22 and turns it around so that the shoe 73 rests upon the tire close to the wheel rim. Such action automatically positions the lower end of the arm 72 to engage the bushing 46a which will pull the arm downwardly.

Next the operator steps on the foot valve 34 to admit air into the apparatus. Automatically the lower shoes rise and the upper shoe lowers to break the beads where the shoes contact the tire side walls. Usually breaking the beads where the shoes contact the tire will cause the entire 360° of both beads to loosen. In the rare event that such action does not loosen the tire bead, the wheel rim may be repositioned on the machine and a second bead breaking operation carried out. When the operator takes his foot off the foot valve 34, the shoes will automatically return to their original position. After the beads are broken loose from the wheel rim, the operator should manually return the upper shoe to the inactive position shown in FIGURE 1.

Once the beads are loose, a tire tool is used to pry the beads over the edge of the rim, either both together or one at a time. The bead opposite the point at which such prying occurs should be forced into the drop center of the wheel rim. The tire tool once it has pried the beads up over the rim, may be rotated by the upright shaft in the machine around the wheel rim sufficiently to raise the beads over the rim. It is preferred to use a lubricant on the tire beads to make the job easier.

Ordinarily, the mounting of a tire on the wheel rim is also accomplished with the rim held on the machine. The gradual rolling of the bead of the tire over the wheel rim and into the proper position may be accomplished with a tire tool driven by the center shaft.

The foregoing detailed description has been given for clearness of understanding only, and no unnecessary limitations should be understood therefrom, for some modifications will be obvious to those skilled in the art.

I claim:

1. A stand for holding an automotive wheel rim for mounting and demounting purposes comprising: an upstanding frame having wheel rim supporting means including a platform and a spindle extending outwardly from the platform in a position to receive the wheel rim positioned about the spindle, fastening means secured to the spindle to clamp the wheel rim against the platform; a tire tool driving shaft rotatably supported in said spindle and having an outer exposed end for engaging a tire tool; bead breaker means on said stand for loosening the tire bead from the tire rim to prepare the tire for demounting from the rim; and drive means for driving said tire tool shaft and said bead breaker means including a pneumatically operated power actuator and a single lever operably associated with said actuator and said tire tool shaft and said bead breakers to drive said shaft and bead breakers in response to selective actuation of said power actuator.

2. A stand for holding an automotive wheel rim for mounting and demounting purposes, comprising: an upstanding frame having wheel rim supporting means including a platform and a spindle extending outwardly from the platform in a position to receive the wheel rim positioned about the spindle, fastening means secured to the spindle to clamp the wheel against the platform; a tire tool drive shaft rotatably supported in said spindle and having an outer exposed end for engaging a tire tool; drive means for said stand including a power actuator and a lever operably associated therewith; means secured to said frame and said drive shaft and in operable relation with said lever to rotate said drive shaft in response to actuation of said lever; upper and lower bead breaker means positioned adjacent the upper and lower tire side wall for movement thereagainst and means connecting both said bead breaker means to said lever for such movement upon actuation of said lever.

3. The stand of claim 2 including means secured to said frame and said tire tool drive shaft and in operable relation with said lever to reversely rotate the drive shaft upon termination of the actuation of said lever.

4. The stand of claim 2 including means on said platform responsive to the positioning of narrower rims thereon to limit the stroke of said lower bead breaker means to prevent damage to the narrower rims.

5. A stand for holding an automotive wheel rim for mounting and demounting purposes, comprising: an upstanding frame having wheel rim supporting means including a platform and a spindle extending outwardly from the platform in a position to receive the wheel rim positioned about the spindle, fastening means secured to the spindle to clamp the wheel rim against the platform; a tire tool drive shaft rotatably supported in said spindle and having an outer exposed end for engaging a tire tool; upper and lower bead breaker means on said stand for loosening the tire bead from the tire rim to prepare the tire for demounting from the rim; and drive means for said tire tool shaft and bead breaker shoes and including a power actuator, a single lever pivoted to said frame and to said power actuator for swinging through an arc, said lower bead breaker means pivoted to said lever for carrying said lower bead breaker means against the tire side wall and further pushing the tire bead into the drop center of the wheel rim, and said lever having an upper bead breaker means arm selectively engageable with said upper bead breaker means for loosening the upper bead of the tire, and a pulley support arm on said lever engaging a cable anchored at opposite ends to said frame and said tire tool shaft, respectively, for turning said shaft in response to actuation of said power actuator.

6. The tire changing stand of claim 5 including a return cable anchored to said stand and said tire tool drive shaft and wrapped about a return idler pulley mounted on a return pulley arm of said lever; and further including means for urging said lever to its normal at rest position whereby said return cable rotates the tire tool shaft in response to said urging means as said lever returns to its at rest position upon inactivation of said power actuator.

7. The tire changing stand of claim 5 including means on said platform responsive to the positioning of smaller rims on the stand changing the magnitude of the stroke of said lower bead breaker means to prevent damage to said smaller rims.

8. A stand for holding an automotive wheel rim for mounting and demounting purposes, comprising: an upstanding frame having wheel rim supporting means including a platform and a spindle extending outwardly from the platform in a position to receive the wheel rim positioned about the spindle, fastening means secured to the spindle to clamp the wheel against the platform; a tire tool drive shaft rotatably supported in said spindle and having an outer exposed end for engaging a tire tool; upper and lower bead breaker menas on said stand for loosening the tire bead from the tire rim to prepare the tire for demounting from the rim; and drive means for said tire tool shaft and bead breaker shoes including a power actuator comprising a pivotally mounted expansible bellows responsive to external actuation to expand generally laterally, a single lever pivoted to said frame and said power actuator for swinging through an arc in response to selective actuation of the actuator, power pulley means operably associated with said lever including a cable secured at one end to the interior of said frame and at the other end to a drive shaft pulley secured to the inner end of said drive shaft and wrapped about an idler pulley intermediate the aforesaid points of securement, said idler pulley being mounted on an arm of said lever for increasing the distance between the point of cable securement to the drive shaft pulley and said idler pulley when said lever swings through said arc to cause said cable to unwind from said drive shaft pulley and rotate said drive shaft; said lower bead breaker means being pivoted to said single lever and movable against the tire side wall to push the tire bead into the drop center of the wheel rim as the lever swings through said arc and said upper bead breaker means being selectively engageable with said single lever for pushing the upper tire bead into the drop center of the wheel rim as said lever swings through said arc.

9. The tire changing stand of claim 8 including return cable means comprising a cable secured at one end to the interior of said frame and at the other end to said drive shaft pulley and wrapped about a return idler pulley secured to an arm of said lever, and further including means for urging said lever to its normal at rest position upon termination of the actuation of said power actuator, whereby said return idler pulley pulls on said return cable as said lever returns to its normal at rest position to cause said cable to unwind from said drive shaft pulley about which it is wound during rotation thereof by said power pulley means and thereby reversely rotate said drive shaft.

10. The tire changing stand of claim 8 including means on said platform responsive to the positioning of smaller rims thereon to limit the stroke of said lower bead breaker means to prevent damage to said smaller rims.

11. A stand for holding an automotive wheel rim for mounting and demounting purposes, comprising: an upstanding frame having wheel rim supporting means including a platform and a spindle extending outwardly from the platform in a position to receive the wheel rim positioned about the spindle, fastening means secured to the spindle to clamp the wheel against the platform; a tire tool drive shaft rotatably supported in said spindle and having an outer exposed end for engaging a tire tool; upper and lower bead breaker means on said stand for loosening the tire bead from the tire rim to prepare the tire for demounting from the rim; and drive means for said tire tool shaft and bead breaker shoes including a power actuator comprising a pivotally mounted expansible bellows responsive to external actuation to expand generally linearally, a single lever pivoted to said frame and said power actuator for swinging through an arc in response to selective actuation, power pulley means operably associated with said lever including a cable secured at one end to the interior of said frame and at the other end to a drive shaft pulley secured to the inner end of said drive shaft and wrapped about a power idler pulley intermediate the aforesaid points of securement, said power idler pulley being mounted on an arm of said lever for pulling the cable from the drive shaft pulley when said lever swings through said arc causing said cable to unwind from said drive shaft pulley and rotate said drive shaft, said lower bead breaker means including inner and outer lower bead breaker shoes pivotally mounted to said single lever adjacent to the tire side wall for movement thereagainst when said lever swings through said arc; and said upper bead breaker means including an arm and a bead breaker shoe at the free end thereof and adapted to be brought into operable pivotal engagement with said lever when said upper shoe is placed adjacent the tire side wall, to pivot said arm in response to movement of said lever through said arc to move said shoe against said tire side wall to force the tire bead into the drop center of the wheel rim.

12. The tire changing stand of claim 11 including return cable means comprising a cable secured at one end to the interior of said frame and at the other end to said drive shaft pulley and wrapped about a return idler pulley secured to an arm of said lever and further including means for urging said lever to its normal at rest position upon termination of the actuation of said power actuator, whereby said return idler pulley pulls on the return cable as said lever returns to its normal at rest position upon termination of actuation thereof to cause said cable to unwind from said drive shaft pulley about which it is wound during rotation thereof by said power pulley means and thereby reversely rotate said drive shaft.

13. The tire changing stand of claim 11 including means on said platform responsive to the positioning of smaller rims on the stand changing the magnitude of the stroke of said lower bead breaker means to prevent damage to smaller rims.

14. The tire changing stand of claim 12 including means on said inner lower bead breaker shoe adapted to track on said rim supporting means to cause said inner lower shoe to engage the tire side wall in an area intermediate said outer lower bead breaker shoe and the juncture of the tire casing and wheel rim.

No references cited.

GRANVILLE Y. CUSTER, JR., *Primary Examiner.*